(12) United States Patent
Castell

(10) Patent No.: US 10,170,851 B2
(45) Date of Patent: Jan. 1, 2019

(54) CONNECTOR WITH A WIRELESS COUPLER

(71) Applicant: HEWLETT-PACKARD DEVELOPMENT COMPANY, L.P., Houston, TX (US)

(72) Inventor: Robin T Castell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/542,831

(22) PCT Filed: Mar. 31, 2015

(86) PCT No.: PCT/US2015/023475
§ 371 (c)(1),
(2) Date: Jul. 11, 2017

(87) PCT Pub. No.: WO2016/159965
PCT Pub. Date: Oct. 6, 2016

(65) Prior Publication Data
US 2018/0013221 A1    Jan. 11, 2018

(51) Int. Cl.
| H01R 13/66 | (2006.01) |
| H01R 13/24 | (2006.01) |
| G06F 1/16 | (2006.01) |
| H01R 13/62 | (2006.01) |
| H02J 50/10 | (2016.01) |
| H02J 7/02 | (2016.01) |

(52) U.S. Cl.
CPC ....... *H01R 13/2421* (2013.01); *G06F 1/1632* (2013.01); *H01R 13/6205* (2013.01); *H02J 7/025* (2013.01); *H02J 50/10* (2016.02)

(58) Field of Classification Search
CPC ............................ H01R 33/7628; H01R 13/72
USPC .................... 439/569, 573, 79, 500
See application file for complete search history.

(56) References Cited

U.S. PATENT DOCUMENTS

| 6,042,414 A | * | 3/2000 | Kunert | ............... | H01R 13/6272 |
| | | | | | 248/310 |
| 6,398,577 B1 | * | 6/2002 | Simmel | .............. | H01R 13/6275 |
| | | | | | 439/341 |

(Continued)

FOREIGN PATENT DOCUMENTS

| KR | 20-0334307 Y1 | 11/2003 |
| KR | 10-2006-0085100 A | 7/2006 |

(Continued)

OTHER PUBLICATIONS

Barnes, H. et al.; "Development of a Pogo Pin Assembly and via Design for Multi-gigabit Interfaces on Automated Test Equipment"; Dec. 12-15, 2006; 1 page.

*Primary Examiner* — Phuong Chi T Nguyen
(74) *Attorney, Agent, or Firm* — Tong, Rea, Bentley & Kim, LLC

(57) ABSTRACT

In example implementations, an apparatus includes a housing. The housing includes an electronic connector coupled to a back side of the housing. In addition, the housing includes a pin coupled to a front side of the housing and in communication with the electronic connector. At least one alignment magnet and at least one wireless transceiver chip is coupled to the housing. At least one waveguide is coupled to the at least one wireless transceiver chip.

15 Claims, 5 Drawing Sheets

(56) References Cited

U.S. PATENT DOCUMENTS

| | | | | |
|---|---|---|---|---|
| 6,558,189 B2 * | 5/2003 | Groebe | ................ | H01R 12/725 439/357 |
| 6,638,092 B2 * | 10/2003 | Groebe | ................ | H01R 12/725 439/341 |
| 6,869,304 B2 * | 3/2005 | Groebe | ................ | H01R 12/725 439/341 |
| 6,875,039 B2 * | 4/2005 | Groebe | ................ | H01R 12/725 439/341 |
| 8,157,571 B2 | 4/2012 | Kadomatsu et al. | | |
| 2002/0182898 A1 | 12/2002 | Takahashi et al. | | |
| 2014/0024314 A1 | 1/2014 | McCormack et al. | | |
| 2014/0059264 A1 | 2/2014 | Sudak | | |
| 2014/0106680 A1 | 4/2014 | McCormack et al. | | |
| 2014/0113461 A1 | 4/2014 | Kim | | |

FOREIGN PATENT DOCUMENTS

| | | |
|---|---|---|
| KR | 10-1285253 B1 | 7/2013 |
| WO | WO-2013162844 | 10/2013 |

* cited by examiner

CONNECTOR WITH A WIRELESS COUPLER

BACKGROUND

A POGO pin connector is a device that is used for docking connection schemes used in electronic devices, e.g., tablets and convertible laptops with keyboard and docking station accessories. The connectors need careful alignment and can degrade over time due to prolonged environmental exposure and mechanical wear and tear. This degradation can produce connection intermittency and further compromise the bandwidth capabilities of the POGO style connector.

DETAILED DESCRIPTION

The present disclosure broadly discloses a POGO pin connector with a wireless coupler. As discussed above, a POGO pin connector is a device that is used for docking connection schemes used in electronic devices, e.g., tablets and convertible laptops with keyboard and docking station accessories. The connectors need attention regarding alignment and can degrade over time due to prolonged environmental exposure and mechanical wear and tear. This degradation can produce connection intermittency and further compromise the bandwidth capabilities of the POGO style connector.

Examples of the present disclosure provide a POGO pin connector with a wireless coupler. In one example, the wireless coupler may be a wireless transceiver chip that may be located on or in a housing of the POGO pin connector to provide half duplex or full duplex data transfer capabilities. The wireless transceiver chip may be used as a back-up for transferring data in case the POGO pin connector fails or to supplement the data transfer rates of the POGO pin connector as the POGO pin connector performance degrades over time. The wireless transceiver chip may also provide greater bandwidth capability than that provided by the POGO pins, thereby, enhancing the overall bandwidth of the connector.

Figure 1:
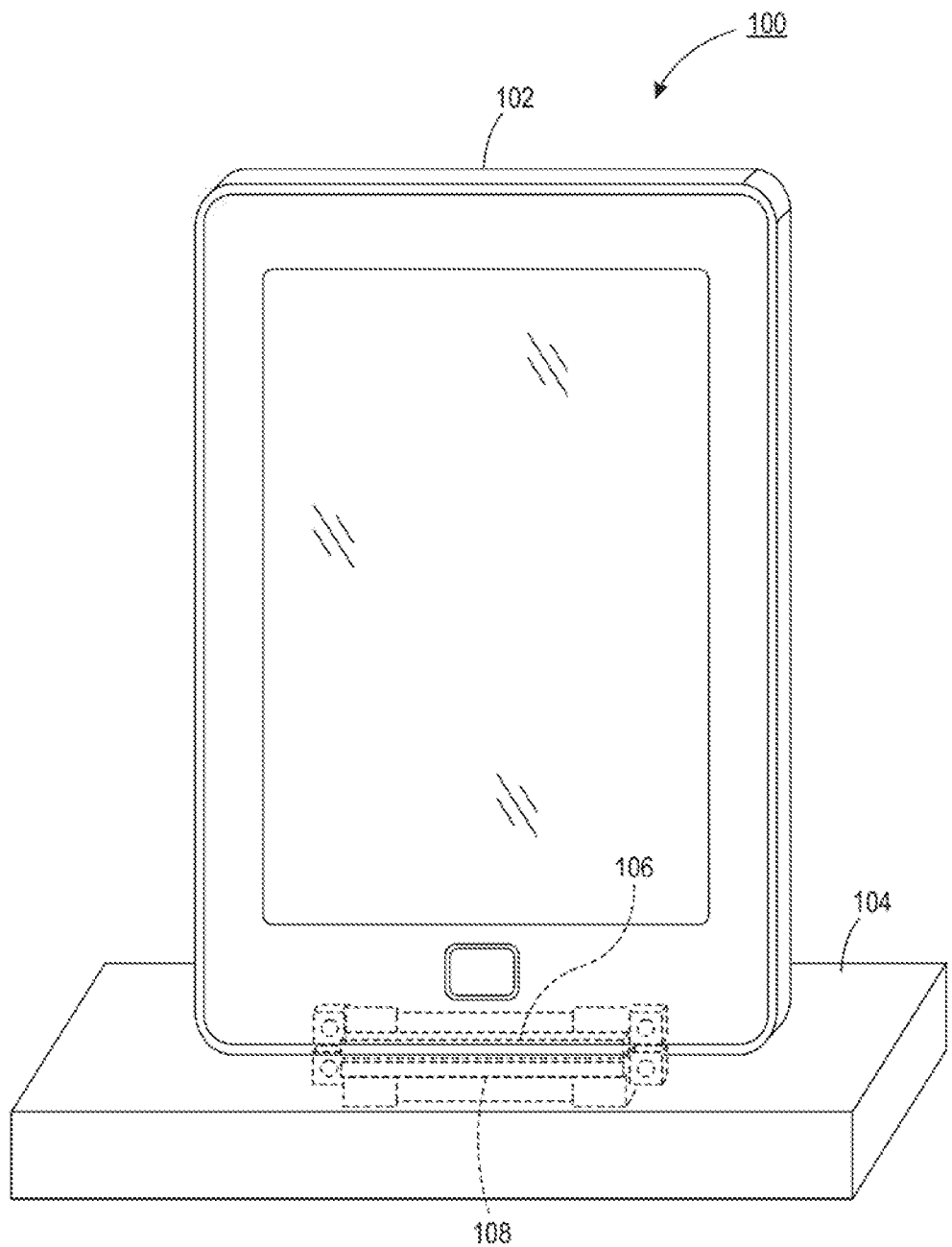
FIG. 1 is a block diagram of an example electronic device and docking station using an apparatus of the present disclosure.

FIG. 1 illustrates an example system 100 that includes an apparatus 106 in an electronic device 102 and an apparatus 108 in a docking station 104. In one example, the apparatus 106 and the apparatus 108 may be a spring loaded pin connector. One example of a spring loaded pin connector may be a POGO pin connector.

In one example, the apparatus 106 and the apparatus 108 may be complementary. For example, the apparatus 106 may have a male portion that mates with or aligns with a female portion of the apparatus 108, or vice versa.

In one example, the electronic device 102 may be any type of electronic device that may use a docking station for data transfer, communications and/or recharging. For example, the electronic device 102 may be a tablet device, smart phone, a laptop and the like.

Figure 2:
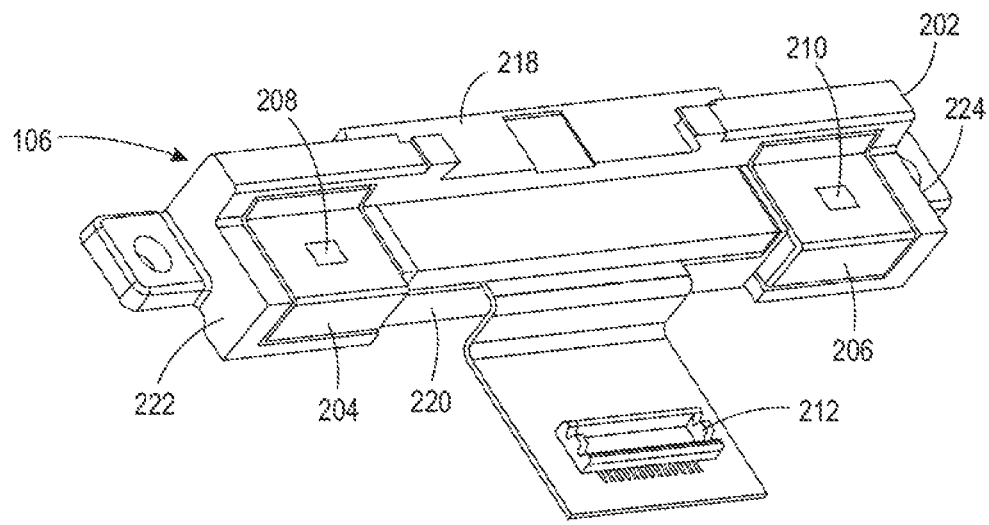
FIG. 2 is a first view of a first example of the apparatus.

FIG. 2 illustrates an example block diagram of the apparatus 106. It should be noted that the apparatus 108 may be identical or complementary to the apparatus 106. In one example, the apparatus 106 includes a housing 202. The housing 202 may be made from a plastic or a plastic framed by a metal shroud. The housing 202 includes a front side 218, a back side 220 and a left end 222 (broadly a first end) and a right end 224 (broadly a second end). In one example, the left end 222 and the right end 224 are located on opposite ends of the housing 202.

In one example, an electronic connector 212 is coupled to the back side 220 of the housing 202. The electronic connector 212 may be coupled to a printed circuit board of the electronic device 102 and may communicate with a processor and a memory of the electronic device 102.

In one example, the housing 202 includes a first alignment magnet 204 and a second alignment magnet 206. Although two alignment magnets 204 and 206 are illustrated in FIG. 2, it should be noted that the housing 202 may include any number of alignment magnets (e.g., more or fewer than two). In one example, the second alignment magnet 206 may be located on an end opposite the first alignment magnet 204. For example, the first alignment magnet 204 may be located on the left end 222 of the housing 202 and the second alignment magnet 206 may be located on the right end 224 of the housing 202 that is opposite the left end 222.

In one example, the first alignment magnet 204 and the second alignment magnet 206 provide additional power charging for the electronic device 102. For example, if at least one pin $216_1$ to $216_n$ (herein also referred to collectively as pins 216 or as a single pin 216) degrade over time causing a reduction in the recharging performance of the pins 216, the first alignment magnet 204 and the second alignment magnet 206 can be used as a supplemental or back-up power channel for sending power to the electronic device 102 for recharging a battery of the electronic device 102. In other words, inductive power transfer implementations can be used to transfer power, e.g., using inductive coupling and the like.

Figure 3:
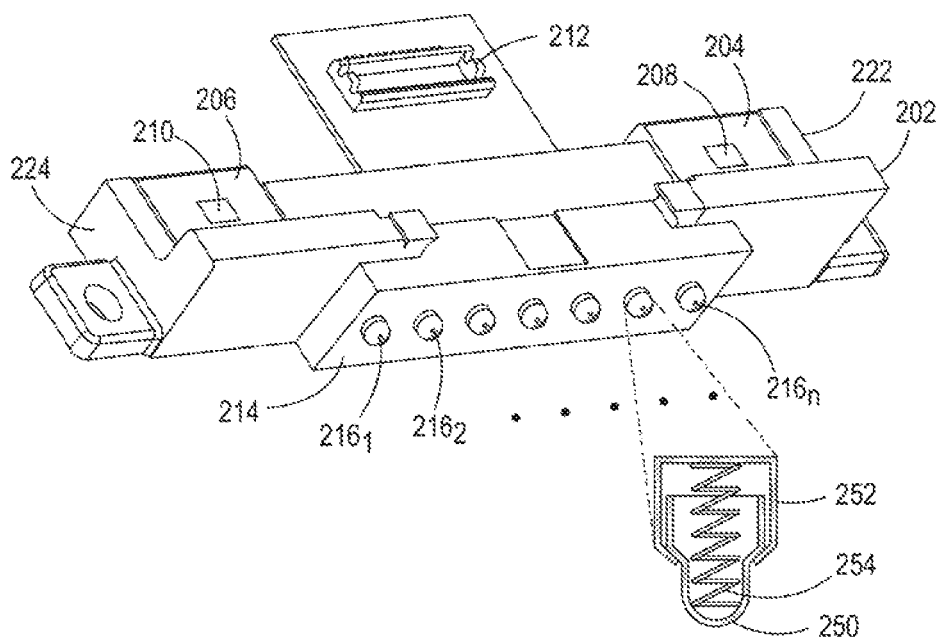
FIG. 3 is a second view of the first example of the apparatus.

In one example, the apparatus 106 comprises a connector portion 214 that is coupled to the front side 218 of the housing 202 as illustrated in FIG. 3. In one example, the connector portion 214 includes at least one pin 216. In one example, the connector portion 214 may include a plurality of pins $216_1$ to $216_n$. In one example, each pin 216 is a spring loaded pin. One example of a spring loaded pin that may be used is a POGO pin. The spring loaded pin includes an inner housing 250, an outer housing 252 and a spring 254 within the inner housing 250 and the outer housing 252.

The inner housing 250 is movably coupled to the spring 254 and the outer housing 252. For example, as pressure is applied to the inner housing 250, the inner housing 250 moves down vertically to compress the spring 254. When the pressure is removed, the spring 254 releases and moves the inner housing 250 vertically upwards.

In one example, the pins 216 are in communication with the electronic connector 212. In other words, the pins 216 may be electrically connected to the electronic connector 212 directly, or indirectly. As a result, data are transferred via at least one pin 216 to the electronic connector 212 to the electronic device 102. In addition, the electronic device 102 may be recharged via power that is transmitted through at least one pin 216 and the electronic connector 212.

In POGO pin connectors, data are transferred via at least one pin 216 and the electronic device 102 is recharged via at least one pin 216, as noted above. However, the pins 216 may degrade negatively over time affecting the performance (e.g., charging times and data throughput) of the pins 216. To help address the degradation in performance of the pins 216, or to provide greater bandwidth performance than that is possible with the traditional POGO pin, the apparatuses 106 and 108 also include a wireless transceiver chip 208. In one example, the apparatuses 106 and 108 may include a second wireless transceiver chip 210.

In one example, the wireless transceiver chips 208 and 210 may be an extremely high frequency electromagnetic (EHF EM) coupler. The wireless transceiver chips 208 and 210 may be capable of half duplex communication (e.g., capable of sending and receiving data, but only one at a time) or full duplex communication (e.g., capable of sending and receiving data at the same time or in parallel).

In one example, the wireless transceiver chips 208 and 210 may be located on the housing 202 to maximize a distance between the wireless transceiver chip 208 and the wireless transceiver chip 210. Maximizing the distance between the wireless transceiver chips 208 and 210 may maximize the efficiency and wireless performance. For example, providing the maximum distance between the wireless transceiver chips 208 and 210 improves isolation of the wireless transceiver chips 208 and 210, which reduces interference and improves data transfer rates.

In one example, the wireless transceiver chips 208 and 210 provide data communications between the docking station 104 and the electronic device 102. For example, as the pins 216 degrade over time, the wireless transceiver chips 208 and 210 may be used to maintain a desired data transfer rate that would otherwise be unattainable with the degraded pins 216. In one example, the wireless transceiver chips 208 and 210 may be provided as a backup to the pins 216 should the pins 216 completely fail. In one example, an option may be provided to a user of the electronic device 102 to allow the user to select an option of transferring data using only the pins 216, only the wireless transceiver chips 208 and 210, or a combination of both.

Figure 4:
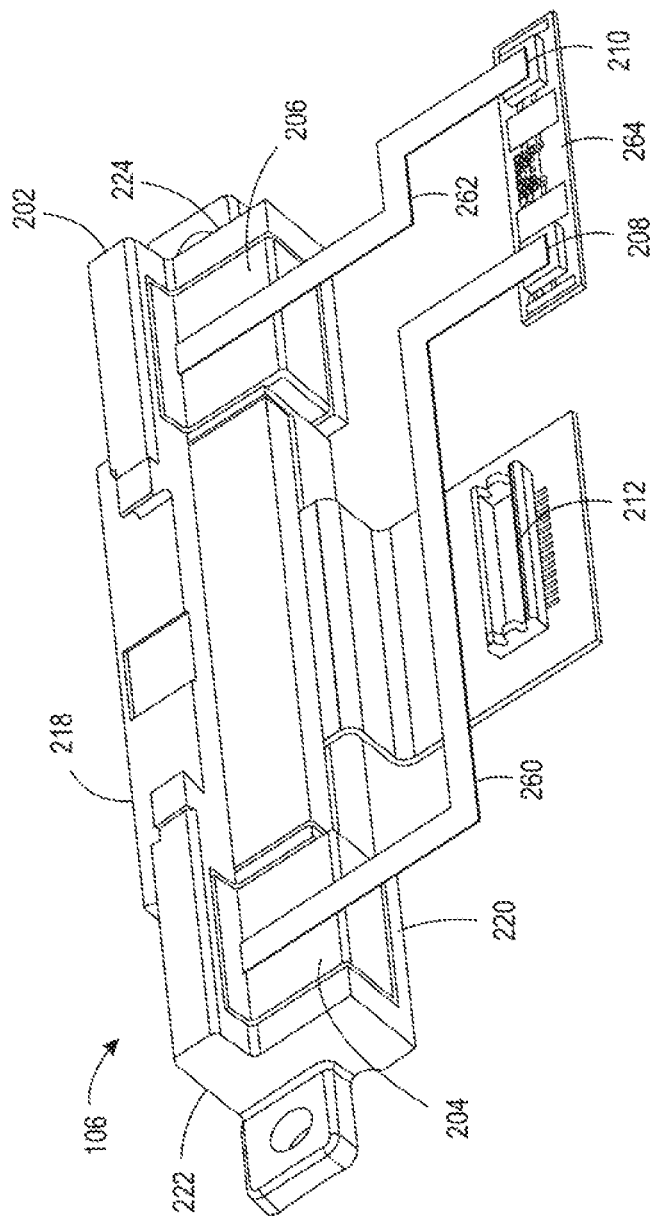
FIG. 4 is a second example of the apparatus.

FIG. 4 illustrates an example block diagram of another example of the apparatus 106. In one example, the apparatus 106 includes waveguides 260 and 262. In one example a first waveguide 260 is associated with the first wireless transceiver chip 208, and a second waveguide 262 is associated with the second wireless transceiver chip 210. In one example, the waveguides 260 and 262 may be defined as a transmission line for data signals (e.g., electromagnetic signals, radio frequency (RF) signals, and the like) sent by the respective wireless transceiver chips 208 and 210. The waveguides 260 and 262 may have a rectangular or circular cross section that is solid plastic and may have conductive walls (e.g., a metal wall). The data signals propagate within the confines of the walls of the waveguides 260 and 262 and are confined by total internal reflection from the walls of the waveguides 260 and 262.

In one example, the wireless transceiver chips 208 and 210 are coupled to a printed circuit board 264 within the electronic device 102. The waveguides 260 and 262 are subsequently coupled to the respective wireless transceiver chips 208 and 210 located on the printed circuit board 264. In one example, the waveguides 260 and 262 may be coupled to a plastic portion of the housing 202 (e.g., along a back side 220 of the housing 202).

Figure 5:
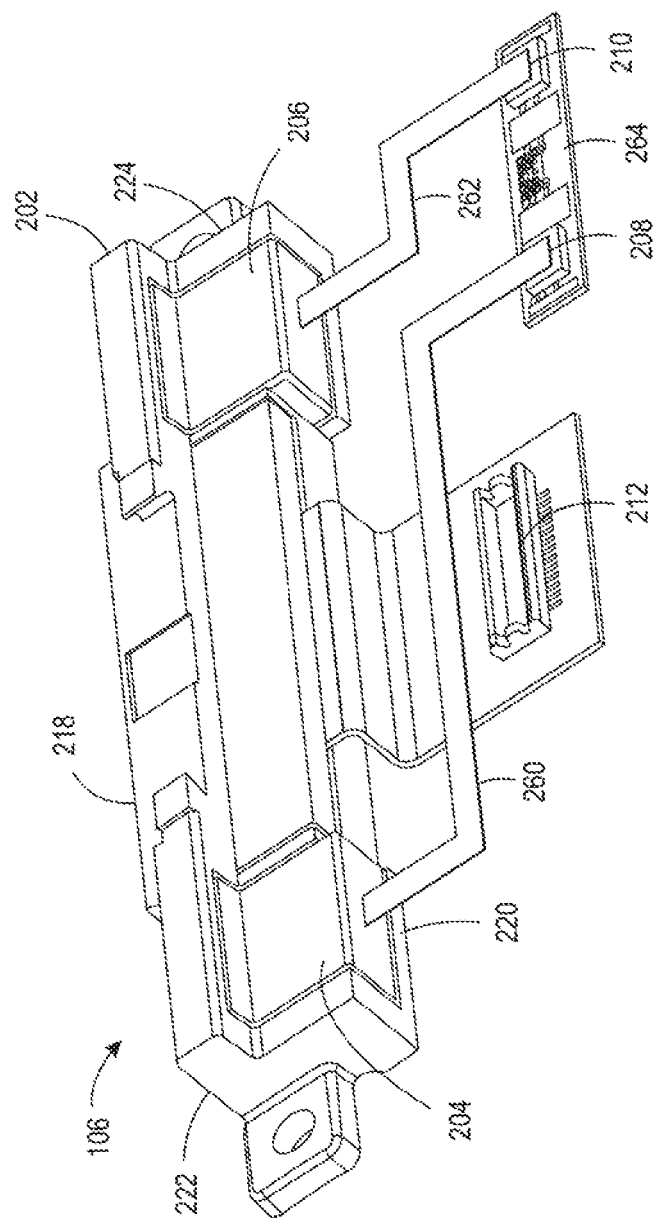
FIG. 5 is third example of the apparatus.

FIG. 5 illustrates a block diagram of yet another example of the apparatus 106. In one example, rather than coupling the waveguides 260 and 262 to the plastic portion of the housing 202 as illustrated in FIG. 4, the waveguides 260 and 262 are coupled to the first alignment magnet 204 and the second alignment magnet 206, respectively. For example, the first alignment magnet 204 and the second alignment magnet 206 may include a hollow opening within the alignment magnets 204 and 206. The waveguides 260 and 262 may be coupled to the alignment magnets 204 and 206 via the openings inside of the alignment magnets 204 and 206.

As a result, the waveguides 260 and 262 are located at an inner edge of the front side 218 of the housing 202. Thus, when the apparatus 106 is coupled to an apparatus 108 also including waveguides, the waveguides 260 and 262 may be adjacent, or next to, the corresponding waveguides of the apparatus 108, as illustrated in FIG. 5 and discussed below. The location of the waveguides 260 and 262 improves the data transfer rates or the data throughput rates of the apparatus 106.

Figure 6:
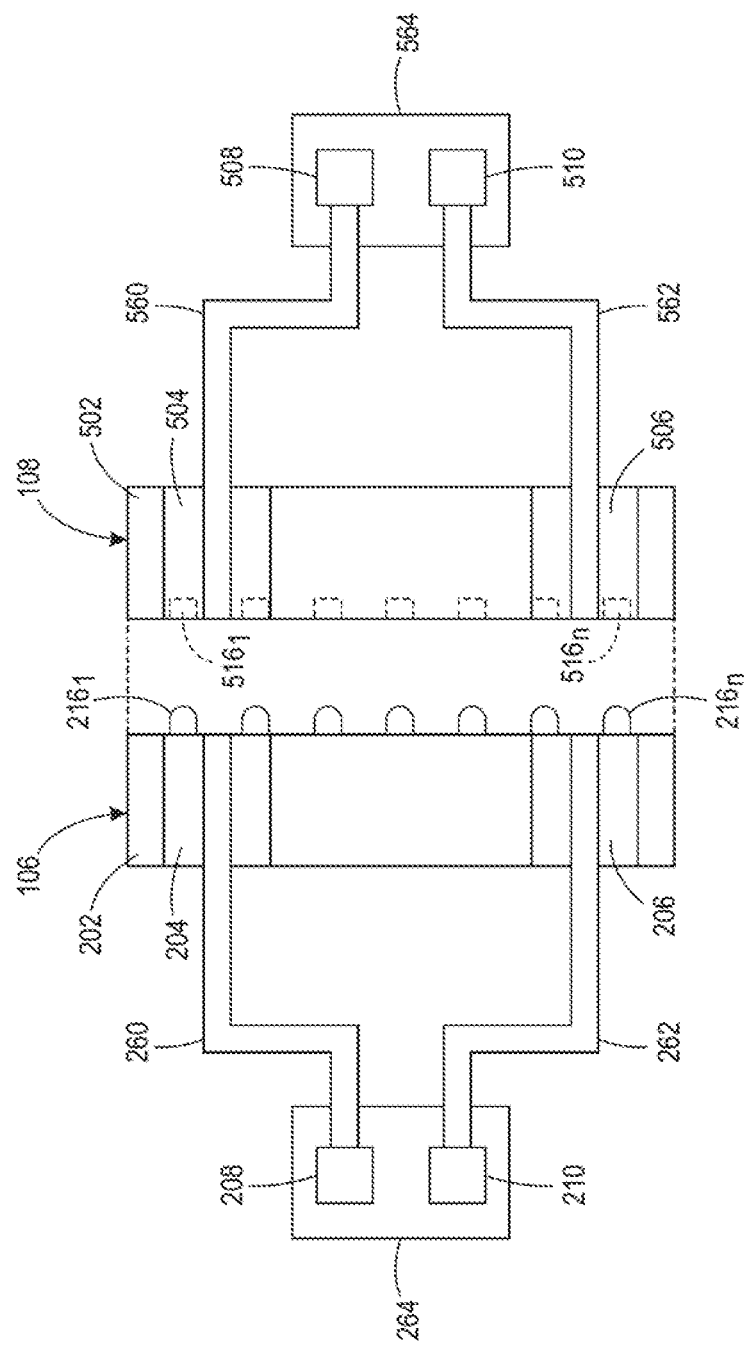
FIG. 6 is an example of the apparatus in the electronic device and the apparatus of the docking station.

As noted above, the apparatus 108 may be located in the docking station 104 and may be similar to, or be, the complement of the apparatus 106. FIG. 6 illustrates the apparatus 108 aligned with the apparatus 106 right before being connected. In one example, the apparatus 108 includes at least one opening $516_1$ to $516_n$ (also herein referred to collectively as openings 516 or individually as an opening 516) that correspond to each one of the pins 216. Each opening 516 includes a conductive wall or pad. Otherwise, the apparatus 108 may be similar to the apparatus 106.

For example, the apparatus 108 includes corresponding alignment magnets 504 and 506, corresponding wireless transceiver chips 508 and 510 on a printed circuit board 564 and corresponding waveguides 560 and 562. The alignment magnets 504 and 506, the wireless transceiver chips 508 and 510 and the waveguides 560 and 562 may be located on a housing 502 of the apparatus 108 similar to the locations described above for the apparatus 106.

As illustrated in FIG. 6, the alignment magnets 504 and 506 are located on the housing 502 such that the alignment magnets 504 and 506 are aligned with the corresponding alignment magnets 204 and 206. The alignment magnets 204, 206, 504 and 506 help to ensure that the pins 216 properly mate with the corresponding openings 516. Also, the alignment magnets 204, 206, 504, 506 provide a retention force that help to secure and maintain the connection between the apparatus 106 and 108. In addition, the alignment magnets 204, 206, 504, 506 may be used to transfer power to the electronic device 102 for recharging.

In addition, the waveguides 560 and 562 are aligned with the corresponding waveguides 260 and 262. The waveguides 560, 562, 260 and 262 can assist in the transmission of data between the wireless transceiver chips 508 and 510 in the apparatus 108 and the wireless transceiver chips 208 and 210 in the apparatus 106.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a housing;
   an electronic connector coupled to a back side of the housing, wherein the electronic connector is to communicate with a circuit board of an electronic device;
   a pin located on a front side of the housing and in communication with the electronic connector;
   a first alignment magnet on a first end of the housing;

a second alignment magnet on a second end of the housing located opposite the first end;
a first wireless transceiver chip that contacts the first alignment magnet; and
a second wireless transceiver chip that contacts the second alignment magnet.

2. The apparatus of claim 1, wherein the pin comprises a spring loaded pin.

3. The apparatus of claim 1, wherein the first end and the second end are located at a maximum possible distance of separation within the housing.

4. The apparatus of claim 1, wherein each of the first wireless transceiver chip and the second wireless transceiver chip comprises an extremely high frequency electromagnetic (EHF EM) coupler.

5. The apparatus of claim 1, wherein the first wireless transceiver chip is coupled to a first waveguide, and the second wireless transceiver chip is coupled to a second waveguide.

6. The apparatus of claim 5, wherein the first waveguide is embedded into the first alignment magnet and the second waveguide is embedded into the second alignment magnet.

7. The apparatus of claim 6, wherein the electronic device is capable of being charged via the first alignment magnet and the second alignment magnet, and is capable of providing data transfer via the first wireless transceiver chip and the second wireless transceiver chip.

8. A apparatus, comprising:
a housing;
an electronic connector coupled to a back side of the housing, wherein the electronic connector is to communicate with a circuit board of an electronic device;
a pin located on a front side of the housing and in communication with the electronic connector;
a first alignment magnet on a first end of the housing;
a second alignment magnet on a second end of the housing located opposite the first end;
a first wireless transceiver chip that contacts the first alignment magnet;
a second wireless transceiver chip that contacts the second alignment magnet; and
at least one waveguide coupled to the first wireless transceiver chip and the second wireless transceiver chip.

9. The apparatus of claim 8, wherein the at least one waveguide is coupled to a plastic portion of the housing.

10. The apparatus of claim 8, wherein the pin comprises a spring loaded pin.

11. The apparatus of claim 10, wherein the first wireless transceiver chip and the second wireless transceiver chip comprise an extremely high frequency electromagnetic (EHF EM) coupler.

12. The apparatus of claim 8, wherein the first wireless transceiver chip is embedded in the first alignment magnet and the second wireless transceiver chip is embedded in the the second alignment magnet.

13. The apparatus of claim 12, wherein the at least one waveguide is coupled to the first alignment magnet and the second alignment magnet.

14. The apparatus of claim 13, wherein the electronic device is capable of being charged via the first alignment magnet and the second alignment magnet and is capable of providing data transfer via the first wireless transceiver chip and the second wireless transceiver chip.

15. An apparatus, comprising:
a housing;
an opening formed on a front side of the housing for receiving a corresponding pin of an electronic device;
a first alignment magnet on a first end of the housing;
a second alignment magnet on a second end of the housing located opposite the first end;
a first wireless transceiver chip that contacts the first alignment magnet;
a second wireless transceiver chip that contacts the second alignment magnet; and
at least one waveguide coupled to the at least one wireless transceiver chip and the housing, wherein the at least one waveguide is for aligning with a corresponding waveguide of the electronic device for transmitting data between the at least one wireless transceiver chip and a corresponding at least one wireless transceiver chip in the electronic device.

* * * * *

UNITED STATES PATENT AND TRADEMARK OFFICE
CERTIFICATE OF CORRECTION

PATENT NO. : 10,170,851 B2
APPLICATION NO. : 15/542831
DATED : January 1, 2019
INVENTOR(S) : Robin T Castell Page 1 of 1

It is certified that error appears in the above-identified patent and that said Letters Patent is hereby corrected as shown below:

In the Claims

In Column 6, Line 14, in Claim 12, after "the" delete "the".

Signed and Sealed this
Fifth Day of March, 2019

Andrei Iancu
*Director of the United States Patent and Trademark Office*